United States Patent
Bemelmans et al.

(10) Patent No.: US 8,151,501 B2
(45) Date of Patent: Apr. 10, 2012

(54) FLEXIBLE DISPLAY SUPPORTED BY HINGED FRAME

(75) Inventors: David J. E. Bemelmans, Eindhoven (NL); Hendrik Dirk Visser, Eindhoven (NL); Michael Johannes Anna Maria Walters, Eindhoven (NL); Johannes Cornelis Antonius Muller, Bladel (NL); Jozef Christiaan Mathieu Versleegers, Bree (BE)

(73) Assignee: Creator Technology B.V., Breda (NL)

( * ) Notice: Subject to any disclaimer, the term of this patent is extended or adjusted under 35 U.S.C. 154(b) by 126 days.

(21) Appl. No.: 12/513,070

(22) PCT Filed: Oct. 31, 2007

(86) PCT No.: PCT/NL2007/050523
§ 371 (c)(1), (2), (4) Date: Apr. 30, 2009

(87) PCT Pub. No.: WO2008/054206
PCT Pub. Date: May 8, 2008

(65) Prior Publication Data
US 2010/0064564 A1    Mar. 18, 2010

Related U.S. Application Data

(60) Provisional application No. 60/863,599, filed on Oct. 31, 2006.

(51) Int. Cl.
*G09F 15/00* (2006.01)

(52) U.S. Cl. .......................................... 40/610; 40/603

(58) Field of Classification Search ................. 40/603, 40/606.16, 607.01, 610; 368/88; 345/1.3, 345/173, 30; 160/377, 152
See application file for complete search history.

(56) References Cited

U.S. PATENT DOCUMENTS

| | | | | |
|---|---|---|---|---|
| 541,672 | A * | 6/1895 | Pappin | 40/610 |
| 1,520,896 | A * | 12/1924 | Wadsworth | 40/603 |
| 2,887,983 | A * | 5/1959 | Budd | 116/63 P |
| 3,322,093 | A * | 5/1967 | Goland et al. | 116/63 R |
| 4,875,302 | A * | 10/1989 | Noffsinger | 40/610 |

(Continued)

FOREIGN PATENT DOCUMENTS

WO    WO 03/050963 A1    6/2003

(Continued)

OTHER PUBLICATIONS

International Search Report for PCT/NL2007/050523 dated Apr. 4, 2008.

*Primary Examiner* — Paul N Dickson
*Assistant Examiner* — Christopher E Veraa

(57) ABSTRACT

A wrap display system (50) employs a stick (70), a flexible display (60) structurally configured to be wrapped around the stick (70), and a hinged frame structurally configured to support the flexible display (60). The flexible display (60) is wrapped around the stick (70) for facilitating a storage of the flexible display (60) and unwrapped from around the stick (70) for facilitating an operation of the flexible display. The hinged frame has a curvilinear configuration for fixing the flexible display (60) in a storage position relative to the stick (70) in response to the flexible display (60) being wrapped around the stick (70), and a planar configuration for fixing the flexible display (60) in an operational position relative to the stick (70) in response to the flexible display (60) being unwrapped from around the stick (70).

27 Claims, 11 Drawing Sheets

U.S. PATENT DOCUMENTS

| | | | |
|---|---|---|---|
| 5,778,580 A * | 7/1998 | Zarelius | 40/610 |
| 6,092,319 A * | 7/2000 | Hicks | 40/603 |
| 6,309,076 B1 * | 10/2001 | McVicker | 359/601 |
| 6,762,929 B2 * | 7/2004 | Sawyer | 361/679.05 |
| 6,771,232 B2 * | 8/2004 | Fujieda et al. | 345/30 |
| 7,158,111 B1 * | 1/2007 | Jackson et al. | 345/107 |
| 7,428,792 B2 * | 9/2008 | Kochan et al. | 40/586 |
| 7,433,179 B2 * | 10/2008 | Hisano et al. | 361/679.27 |
| D580,928 S * | 11/2008 | Bemelmans et al. | D14/345 |
| 7,463,238 B2 * | 12/2008 | Funkhouser et al. | 345/107 |
| 7,636,085 B2 * | 12/2009 | Yang | 345/204 |
| 7,639,237 B2 * | 12/2009 | Perkins | 345/168 |
| 2002/0070910 A1 | 6/2002 | Fujieda et al. | |
| 2003/0144034 A1 * | 7/2003 | Hack et al. | 455/566 |
| 2007/0216639 A1 * | 9/2007 | LaFarre et al. | 345/107 |
| 2008/0086925 A1 * | 4/2008 | Yang | 40/610 |
| 2008/0204367 A1 * | 8/2008 | Lafarre et al. | 345/55 |
| 2008/0211733 A1 * | 9/2008 | Huitema | 345/3.1 |
| 2009/0183406 A1 * | 7/2009 | Burtch | 40/605 |
| 2009/0267870 A1 * | 10/2009 | Schellingerhout | 345/55 |
| 2009/0315809 A1 * | 12/2009 | Shibukawa et al. | 345/1.3 |

FOREIGN PATENT DOCUMENTS

| | | |
|---|---|---|
| WO | WO 2006/038171 A1 | 4/2006 |
| WO | WO 2006/085271 A2 | 8/2006 |

\* cited by examiner

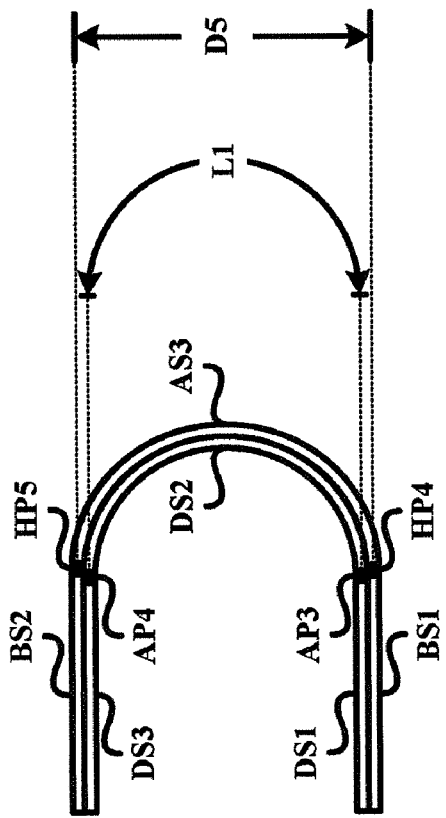
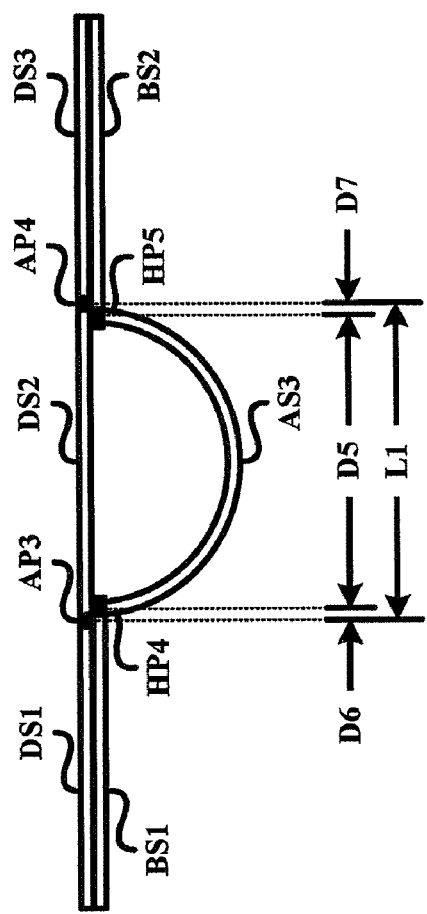
FIG. 7
FIG. 8

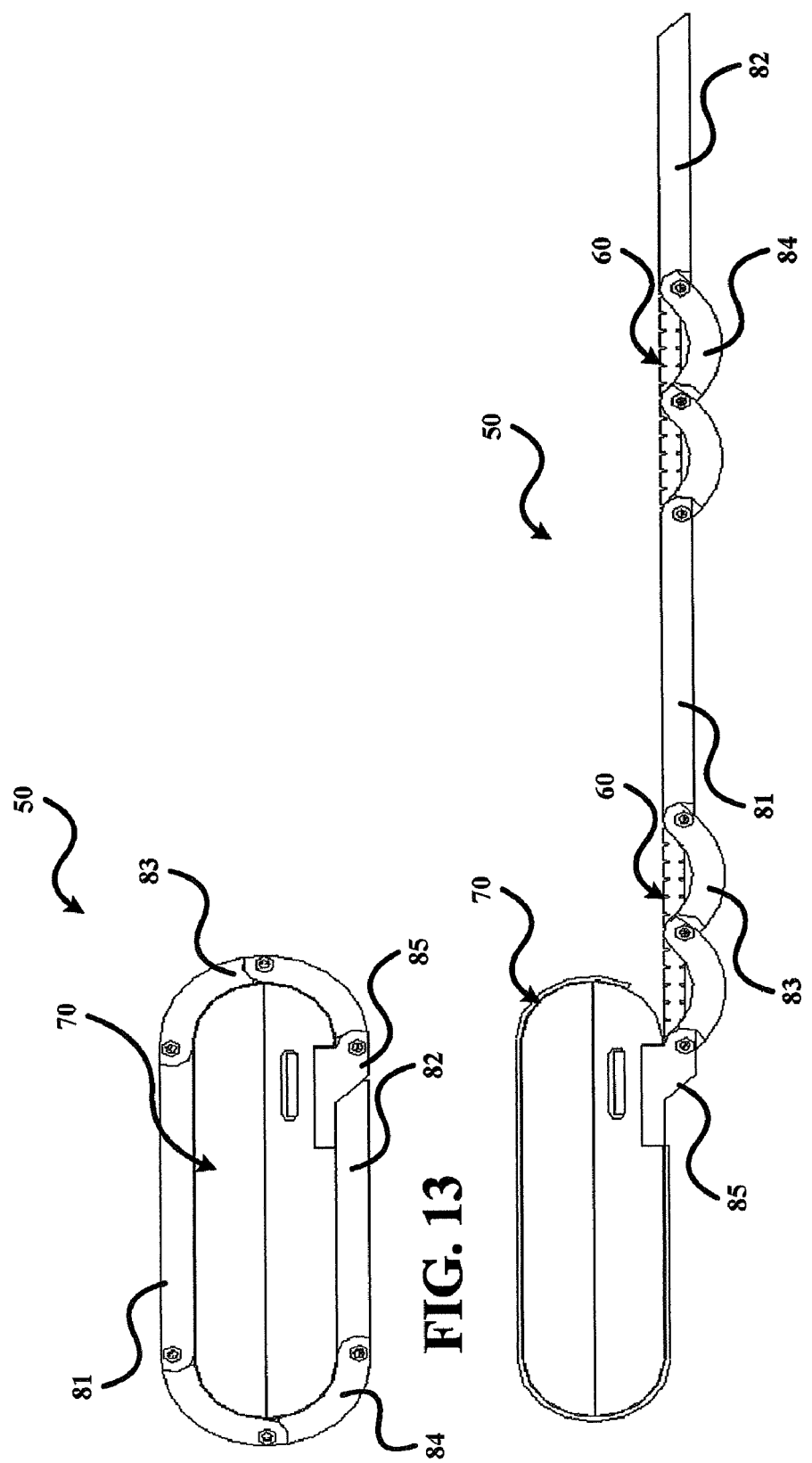

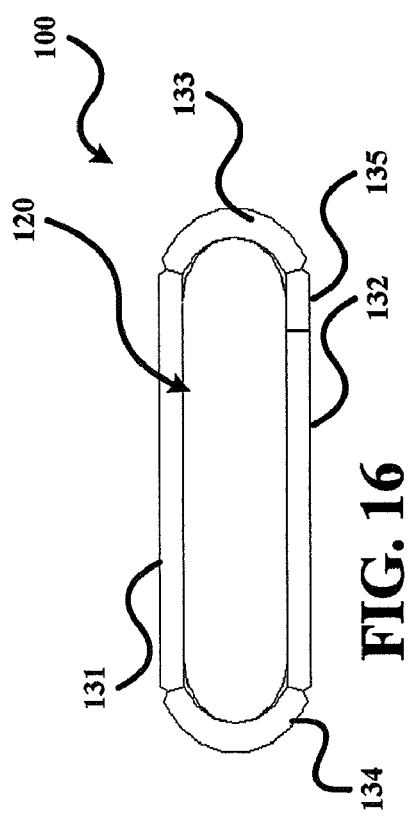
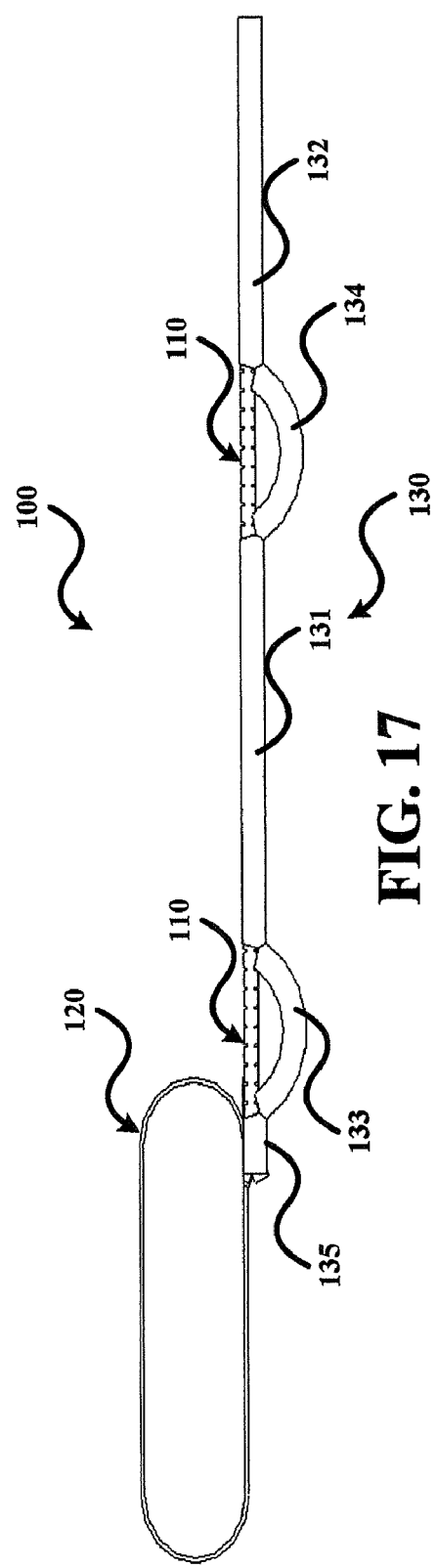

FLEXIBLE DISPLAY SUPPORTED BY HINGED FRAME

FIELD OF THE INVENTION

The present invention generally relates to flexible displays. The present invention specifically relates to an efficient incorporation of a flexible display into a wrap display system.

BACKGROUND

Rolling display systems currently employ flexible displays that are rolled into a case for facilitating a storage of the flexible display therein, and unrolled out of the case for facilitating an operation of the flexible display. An example of such a rolling display system is disclosed in U.S. Patent Application Publication No. 2002/0196205A1. Within the case, the flexible display can be wrapped around various display driving components within the case whereby either a rolling radius of the flexible display must be large enough to support immobile display drive components within the case and/or movement among display drive components within the case is required to facilitate the rolling/unrolling of the flexible display. One drawback to this rolling/unrolling approach of the flexible display are the limitations imposed on a construction of an optimal shape of the case with minimal dimensions for purposes of achieving a highest degree of portability of the case at minimal cost.

One solution to this drawback is a wrap display system having a flexible display that is wrapped around a stick for facilitating a storage of the flexible display and unwrapped from the stick for facilitating an operation of the flexible display. The unwrapping of the flexible display from the stick requires the flexible display being flat and straight to facilitate an adequate readability of the flexible display. The display industry is therefore continually striving to improve upon an incorporation of a flexible display into a display system in view of achieving an adequate readability of the flexible display.

SUMMARY OF THE INVENTION

To this end, the present invention provides new and unique structural forms of a wrap display system having a flexible display that is wrapped around a stick for facilitating a storage of the flexible display and unwrapped from the stick for facilitating an operation of the flexible display. The wrap display system further includes a hinged frame structurally configured to support the flexible display. In a first form of the present invention, the hinged frame has a curvilinear configuration for fixing the flexible display in a storage position with respect to the stick in response to the flexible display being wrapped around the stick. In a second form of the present invention, the hinged frame has a planar configuration for fixing the flexible display in an operational position with respect to the stick in response to the flexible display being unwrapped from the stick.

BRIEF DESCRIPTION OF THE DRAWINGS

The foregoing forms as well as other features and advantages of the present invention will become further apparent from the following detailed description of various embodiments of the present invention, read in conjunction with the accompanying drawings. The detailed description and drawings are merely illustrative of the present invention rather than limiting, the scope of the present invention being defined by the appended claims and equivalents thereof.

FIGS. 7 and 8 illustrate side views of a second embodiment of a hinged rigid base supporting the flexible display illustrated in FIGS. 3 and 4 in the curvilinear position and the planar position, respectively, in accordance with the present invention;

FIGS. 13 and 14 illustrate respective side views of the wrap display system illustrated in FIGS. 11 and 12 in accordance with the present invention;

FIGS. 16 and 17 illustrate side views of the wrap display system illustrated in FIG. 15 in a storage state and an operation state, respectively, in accordance with the present invention.

DETAILED DESCRIPTION OF THE DRAWINGS

One inventive principle of the present invention is to structurally configure a flexible display foil including an integration of a flexible display and a display cover that can be wrapped and unwrapped from around a stick. The present invention does not impose any limitations or restrictions as to the integration of the flexible display and the display cover. Thus, the term "integration" is broadly defined herein as an assembly of the flexible display and the display cover as a single unit, such as, for example, a mounting of the flexible display onto an external surface of the display cover, or a positioning of the flexible display within a multi-layered display cover where the flexible display is viewable through an open window or a transparent window of the display cover.

The present invention also does not impose any limitations or restrictions on the structural configuration and material composition of a flexible display and a display cover of the present invention. In one embodiment, a flexible display of the present invention can be a device provided by a company presently being organized called Polymer Vision Ltd., which has a layered flexible display consisting of a back layer of a thin/organic film serving as a base, a middle layer of organic electronics serving as an active matrix for driving the images of the flexible display, and a top layer of an electronic ink printed on a sheet of plastic.

In practice, the specific implementations of a flexible display foil of the present invention is dependent upon the commercial implementations of the present invention, and are therefore without limit. The following description of FIG. 1 provides an exemplary embodiment of a flexible display foil of the present invention incorporating the aforementioned first inventive principle of the present invention.

Figure 1:
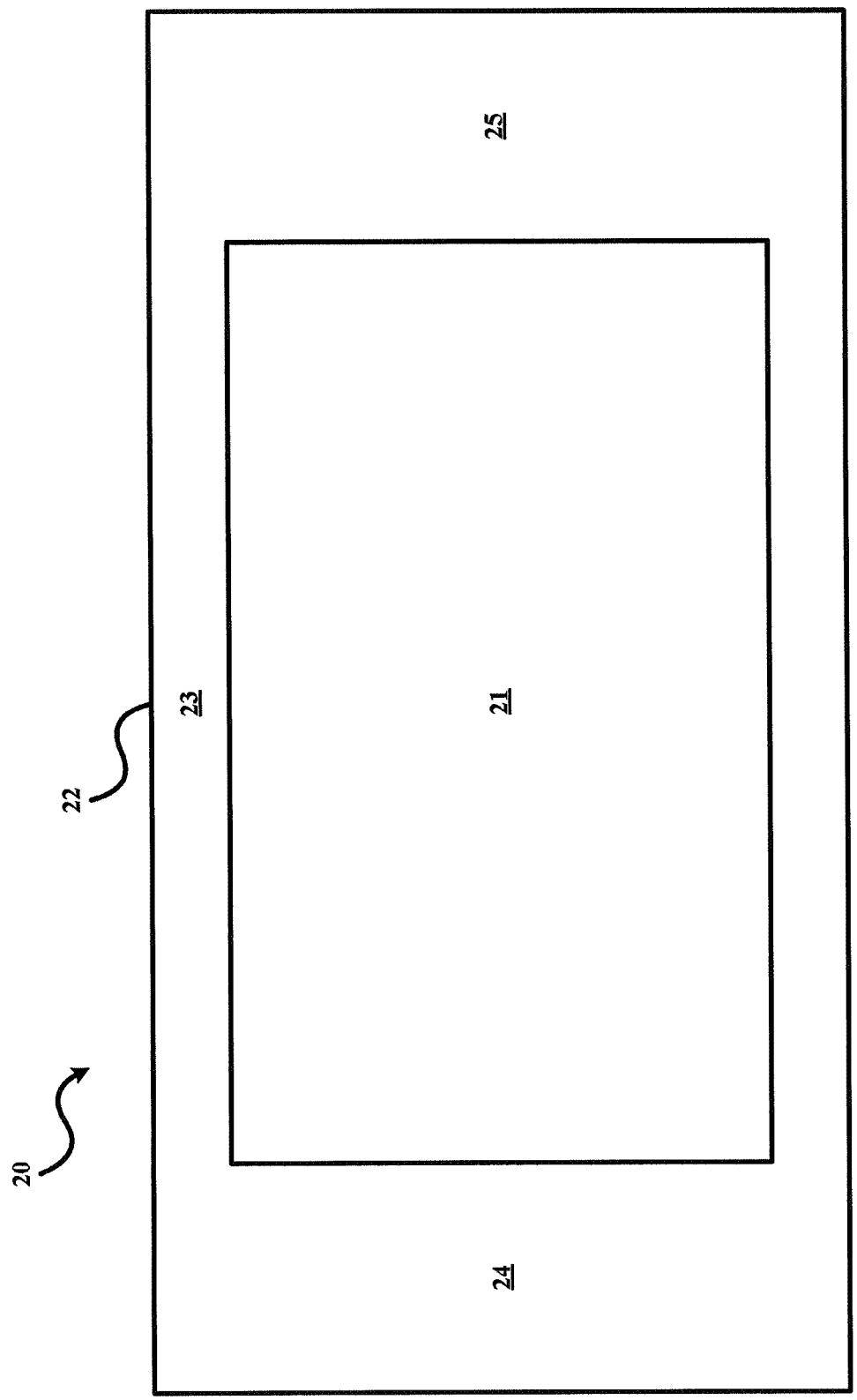
FIG. 1 illustrates a top view of one embodiment of a flexible display foil in accordance with the present invention.

As illustrated in FIG. 1, a flexible display foil 20 employs a flexible display 21 and a display cover 22 integrated relative to a display section 23 of display cover 22. An attachment section 24 of display cover 22 facilitates a coupling of flexible display foil 20 to a stick in any conventional manner. The dimensions of attachment section 24 can be selected to be less than, equal to or greater than a perimeter of the stick. Additionally, a portion of attachment section 24 can be coupled to an external surface and/or an interface surface of the stick, and/or a portion or an entirety of attachment section 24 can be permanently wrapped around the stick. An optional control section 25 of display cover 22 facilitates a construction of a keyboard or any other type of mechanism for controlling flexible display 21 as needed.

A second inventive principle of the present invention is to structurally configure a hinged frame having a curvilinear configuration for fixing a flexible display in a storage position with respect to a stick when the flexible display is wrapped around the stick (i.e., a body having a tubular configuration having a circular, elliptical, rectangular with rounded corners, square with rounded corners or any other curvilinear cross-section). The hinged fringe is further structurally configured under the second inventive principle of the present invention to have a planar configuration for fixing the flexible display in an operational position with respect to the stick when the flexible display is unwrapped from around the stick (i.e., a flat and straight configuration of a viewing screen of the flexible display within a single plane).

The present invention does not impose any limitations or restrictions to the structural configuration and material composition of a hinged frame of the present invention. Thus, in practice, the specific implementations of a hinged frame of the present invention is dependent upon the commercial implementations of the present invention, and are therefore without limit. In one embodiment, a hinged frame of the present invention employs one or more rigid base supports and one or more hinge supports for supporting a flexible display. The following description of FIG. 2 provides an exemplary embodiment of a hinged frame employing two (2) rigid base supports and two (2) hinge supports.

Figure 2:
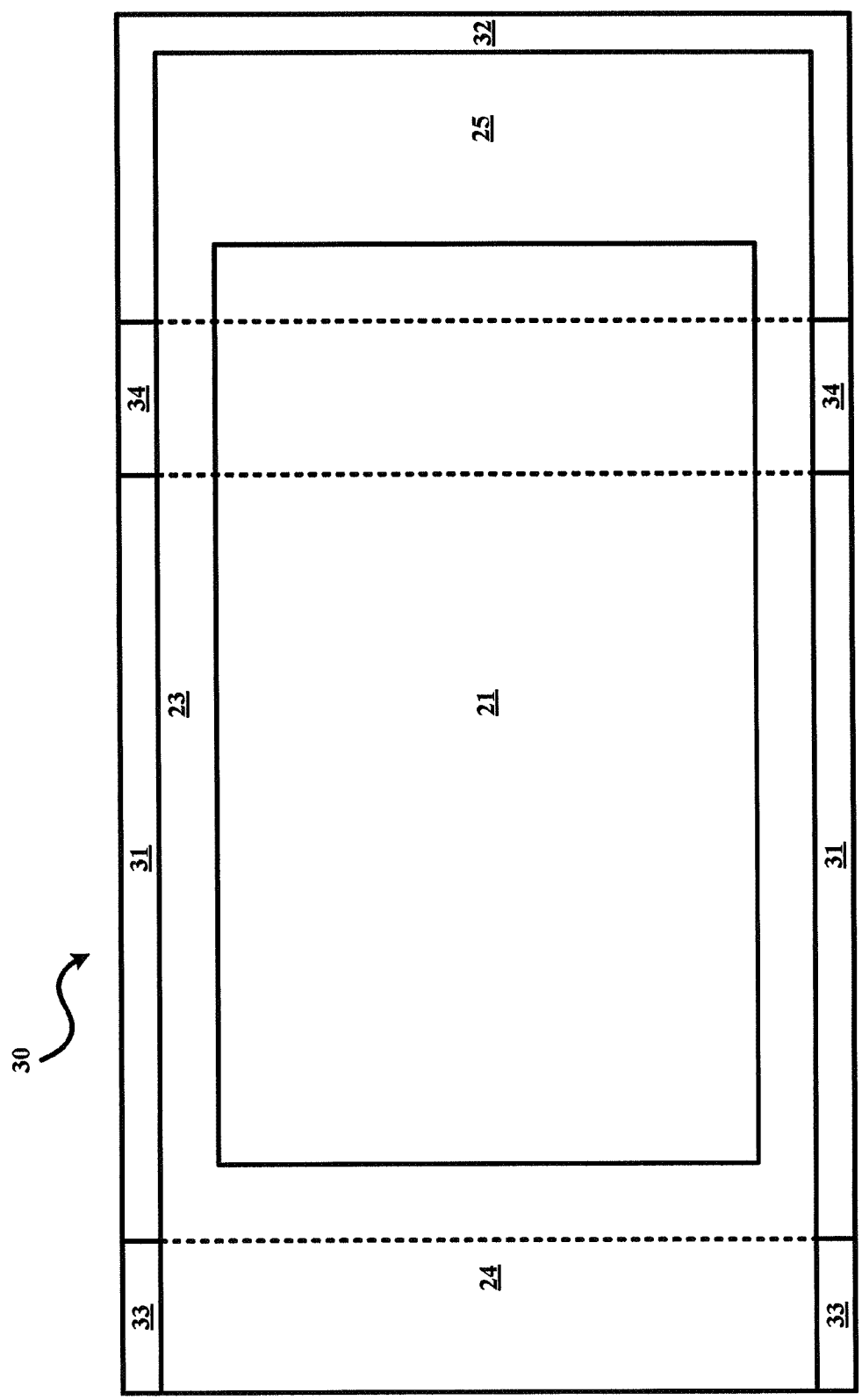
FIG. 2 illustrates a top view of one embodiment of a hinged rigid base supporting a flexible display foil in accordance with the present invention.

Referring to FIG. 2, a hinged frame 30 of the present invention partially encircling flexible display foil 20 with attachment section 24 being unobstructed by hinged frame 30. Hinged frame 30 employs two (2) rigid base supports 31 and 32 and two (2) hinge supports 33 and 34, with each support 31-34 vertically extending across flexible display foil 20. Hinge support 33 is hinged to rigid base support 31 whereby hinge support 33 is pivotable relative to rigid base support 31. Hinge support 33 may also be hinged to a stick whereby hinge support 33 would be additionally pivotable relative to the stick. Hinge support 34 is hinged to rigid base supports 31 and 32 whereby hinge support 33 is pivotable relative to rigid base supports 31 and 32.

Figure 3:
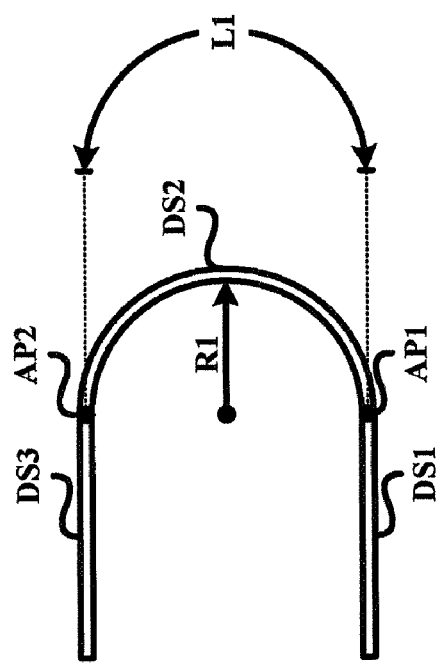
FIGS. 3 and 4 illustrate side views of a curvilinear configuration and a planar configuration of a flexible display foil in accordance with the present invention.
Figure 4:
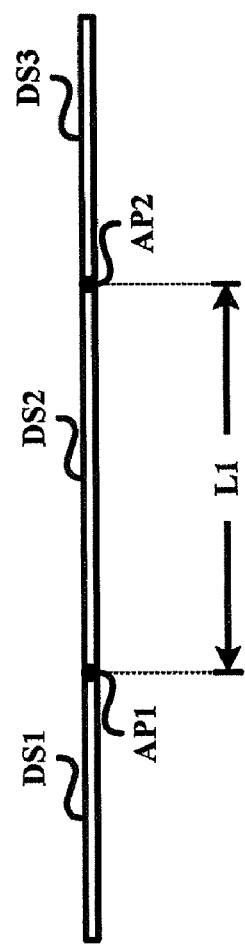

To further illustrate the pivotal interaction between the rigid base supports and the hinge supports of a hinged frame in accordance with the of the present invention, FIG. 3 illustrates three (3) display segments DS1-DS3 of a flexible display in a curvilinear profile of the flexible display involving display segments DS1 and DS3 having a planar shape and display segment DS2 being in a curved shape of an approximately constant radius R1 designed to uniformly wrap display segment DS2 around a stick. With "approximately constant radius R1" is meant that although preferably the radius R1 of the display segment D2 may be constant, the radius may show a deviation of about max 35% between the connection with the neighboring display segment (DS1, DS3) and the middle of the display segment D2 between both connections. With this deviation the profile of the display segment DS2 is adapted to that of the end portion of the stick and it is still possible to uniformly wrap display segment DS2 around the stick. A larger deviation will result in too large risk of damage of the display and for an unacceptable volume of the stick. For manufacturing reasons the deviation of R1 is about 3-6%. Alternatively, the display segment DS2 may show a substantially elliptical arch with locally a smaller, approximately constant R1 from the connection with the neighbouring display segment DS1, DS3 and a larger R1 in the middle of segment DS2. Also in this configuration the profile of the display segment is adapted to the profile of the end portion of the stick that shows a somewhat flattened surface at the top. Conversely, FIG. 4 illustrates the flexible display in a planar profile involving all of the display segments DS1-DS3 having a planar shape. Referring to FIGS. 3 and 4, display segments DS1 and DS3 are to be adjacent and attached to rigid base supports of a hinged frame and therefore will always be in planar profile irrespective as to whether the flexible display is wrapped around a stick or unwrapped from around the stick. By contrast, display segment DS2 is to be adjacent and unattached to a hinge support of the hinged frame. As such, an identification of attachment points AP1 and AP2 as endpoints of display segment DS2 is essential to ensure that display segment DS2 is uniformly stowed over its entire length L1 within an adjacent hinge support in response to being in the curvilinear profile shown in FIG. 3 and to ensure that display segment DS2 is flat and straight over its entire length L1 relative to the adjacent hinge support in response to being in the planar profile shown in FIG. 4.

Figure 5:
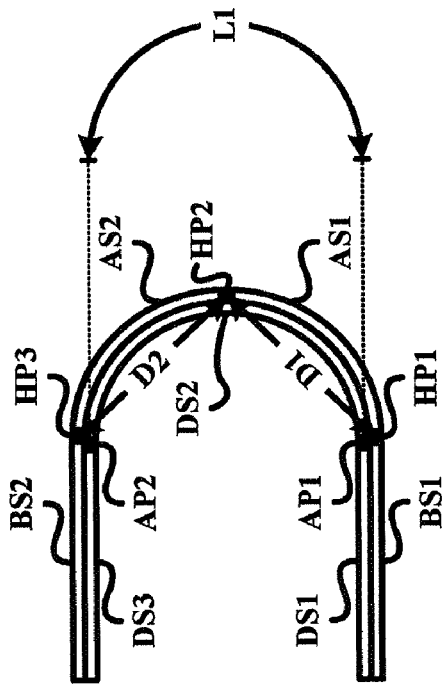
FIGS. 5 and 6 illustrate side views of a first embodiment of a hinged rigid base supporting the flexible display illustrated in FIGS. 3 and 4 in the curvilinear position and the planar position, respectively, in accordance with the present invention.

Specifically, FIG. 5 illustrates a hinge support having an arch segment AS1 hinged to a rigid base support BS1 at a hinged point HP1 and an arch segment AS2 hinged to a rigid base support BS2 at hinged point HP3 with arch segments AS1 and AS2 being hinged at hinge point HP2. A distance D1 between hinge points HP1 and HP3 extends across arch segment AS1. A distance D2 between hinge points HP2 and HP3 extends across arched segment AS2. A distance D3 (shown in FIG. 6) between attachment point AP1 and hinge point HP1 extends along rigid base support BS1 whereby D3≧0. And, a distance D4 (shown in FIG. 6) between attachment point AP2 and hinge point HP3 extends along rigid base support BS2 with distance D4 preferably equaling distance D3.

Figure 6:
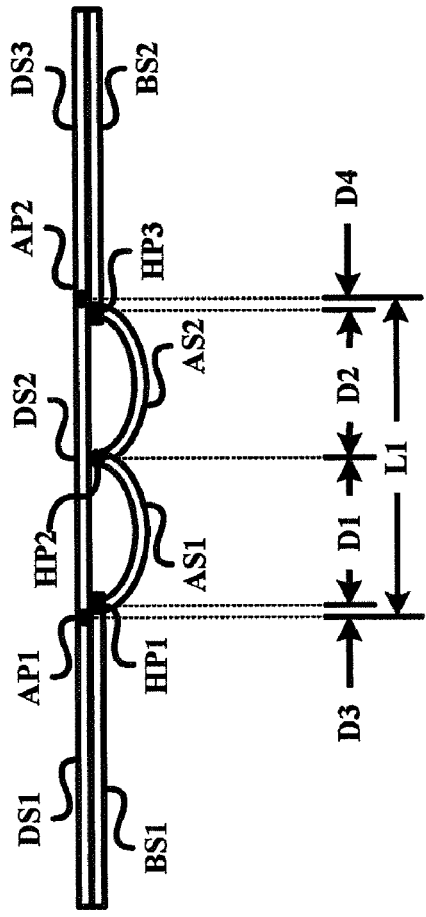

A summation of distances D1-D4 must equal length L1 of display segment DS2 to ensure display segment DS2 is uniformly stowed over it entire length L1 within arch segments AS1 and AS2 when display segment DS2 has the curved shape shown in FIG. 5 based arch segments AS1 and AS2 being in a closed state, and to ensure that display segment DS2 is flat and straight over its entire length L1 relative to arch segments AS1 and AS2 when display segment DS2 has the planar shape shown in FIG. 6 based on arch segments AS1 and AS2 being in an open state. Those having ordinary skill in the art will appreciate a wrapped radius of arch segment AS1 and arch segment AS2 is based on the wrapped radius R1 of display segment DS1 (FIG. 3) and is determinative of distances D3 and D4.

By further example, FIGS. 7 and 8 illustrate a hinge support having a single arch segment AS3 hinged to rigid base support BS1 at a hinged point HP4 and hinged to rigid base support BS2 at hinged point HP5. A distance D5 between hinge points HP4 and HP5 extends across arch segment AS3.

A distance D6 between attachment point AP3 and hinge point HP4 extends along rigid base support BS1 whereby D6≧0. And, a distance D7 between attachment point AP4 and hinge point HP5 extends along rigid base support BS2 with distance D7 preferably equaling distance D6.

A summation of distances D5-D7 must equal length L1 of display segment DS2 to ensure display segment DS2 is uniformly stowed over it entire length L1 within arch segment AS3 when display segment DS2 has the curved shape shown in FIG. 7 based on arch segment AS3 being in a closed state, and to ensure that display segment DS2 is flat and straight over its entire length L1 relative to arch segment AS3 when display element DS2 has the planar shape shown in FIG. 8 based on arch segment AS3 being in an open state. Those having ordinary skill in the art will appreciate a radius of arch segment AS3 is based on the wrapped radius R1 (FIG. 3) of display segment DS2 and is determinative of distance D2 and distance D3.

A third inventive principle of the present invention is to structurally configure a stick (e.g., any type of hollow body suitable for wrapping an object around) to support an optimal structural configuration of its internal components (e.g., driving electronics, connectors, etc.) and its external components (e.g., buttons and interface slots) without requiring any movement of these components upon a wrapping of a flexible display foil (e.g., FIG. 1) on the stick or an unwrapping of the flexible display foil from around the stick. The present invention does not impose any limitations or restrictions to the structural configuration and material composition of the components of a stick of the present invention. Thus, in practice, the specific implementations of a stick of the present invention is dependent upon the commercial implementations of the present invention, and are therefore without limit. The following descriptions of FIGS. 9 and 10 provides exemplary embodiments of sticks incorporating the aforementioned third inventive principle of the present invention.

Figure 9:
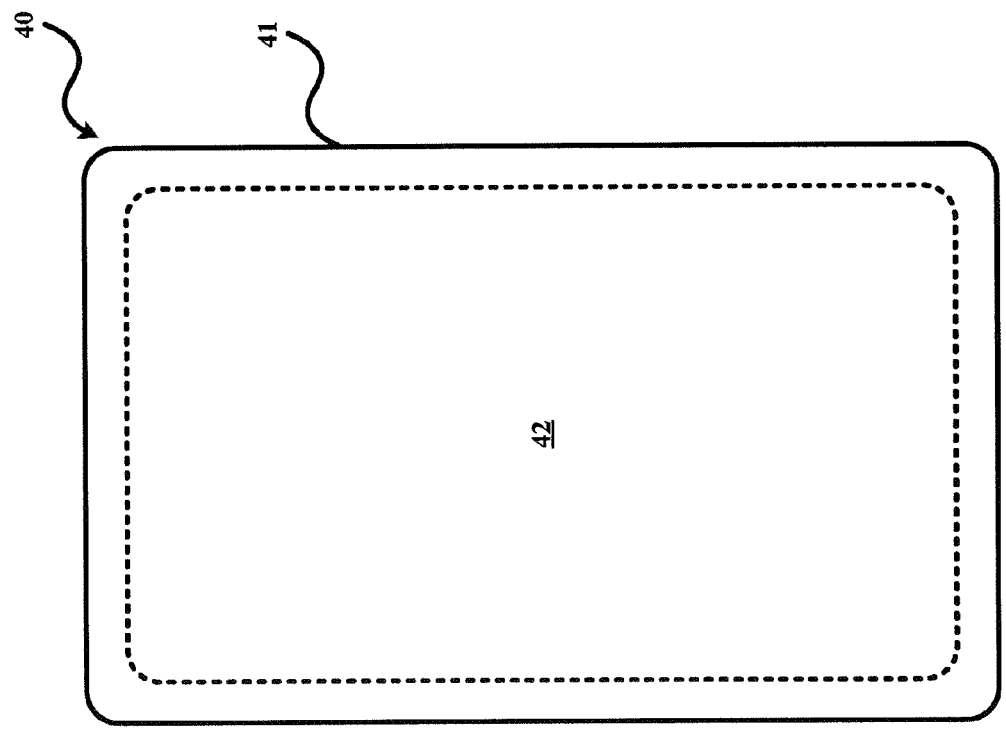
FIG. 9 illustrates a front view of a first embodiment of a stick in accordance with the present invention.

In one embodiment, as illustrated in FIG. 9, a stick 40 employs a cylindrical housing 41 defining a cavity 42 therein that facilitates a fixed incorporation of internal components in a standard configuration (e.g., a printed circuit board). A cross-section of cylindrical housing 41 can be circular, elliptical, rectangular with rounded corners, square with rounded corners or any other curvilinear cross-section, and an outside radius of cylindrical housing 41 at any point should not be less than a minimum roll-up radius of a flexible display employed within the present invention. Additionally, housing 41 can include two or more segments that are partially or entirely separable to facilitate a repair or replacement of any of its internal components.

Figure 10:
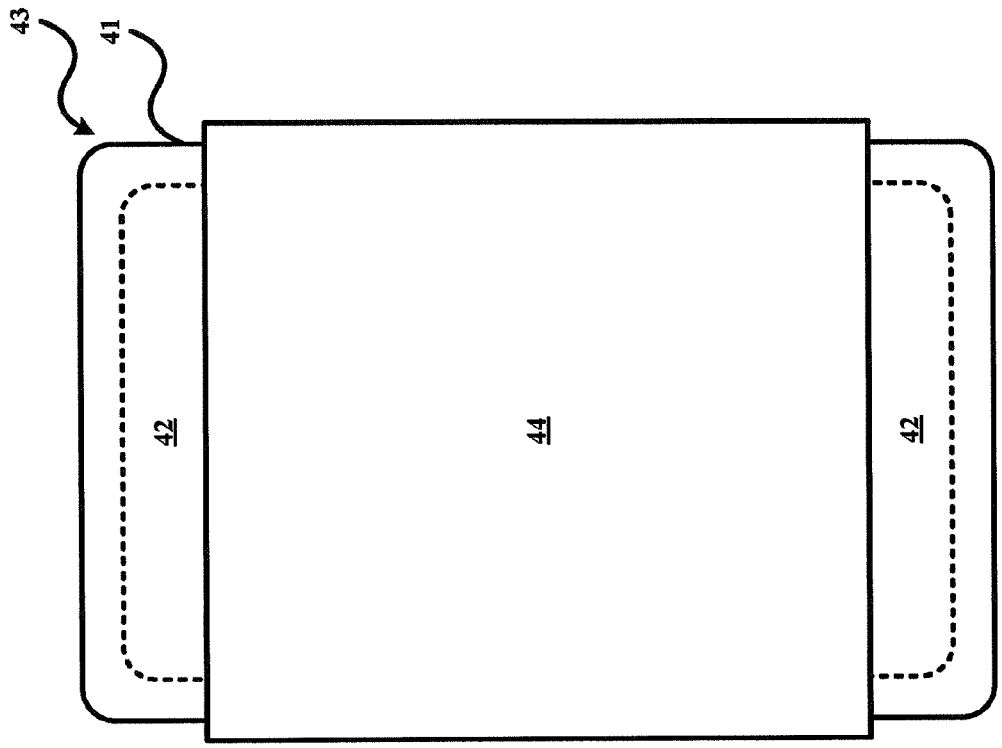
FIG. 10 illustrates a front view of a second embodiment of a stick in accordance with the present invention.

In a second embodiment, as illustrated in FIG. 10, a stick 43 further employs a platform 44 encircling housing 41 with platform 44 having a structural configuration for shielding a flexible display when a flexible display foil is wrapped around stick 43, such as, for example when flexible display foil 20 (FIG. 1) is wrapped around stick 43. Concurrently or alternatively, platform 44 may support additional displays and/or display control mechanisms, such as for example, a secondary display integrated with a rear face of flexible display foil.

FIGS. 9-12 illustrate a wrap display system 50 of the present invention incorporating all three inventive principles of the present invention. As shown, wrap display system 50 employs a flexible display foil 60 coupled to a stick 70. Portions of flexible display foil 60 adjacent rigid base supports 81 and 82 of a hinged frame 80 are securely connected to rigid base supports 81 and 82. A hinge support 83 of hinged frame 80 has one arch segment unattached to flexible display foil 60 and hinged to stick 70 via a pair of brackets (of which only a bracket 85 is shown). Hinge support 83 further has another arch segment unattached to flexible display foil 60 and hinged to rigid base support 81. A hinge support 85 of hinged frame 80 has one arch segment unattached to flexible display foil 60 and hinged to rigid base support 81. Hinge support 83 further has another arch segment unattached to flexible display foil 60 and hinged to rigid base support 82. It is noted that alternatively hinge supports 83 and 85 may comprise more than two e.g. three arch segments.

Figure 11:
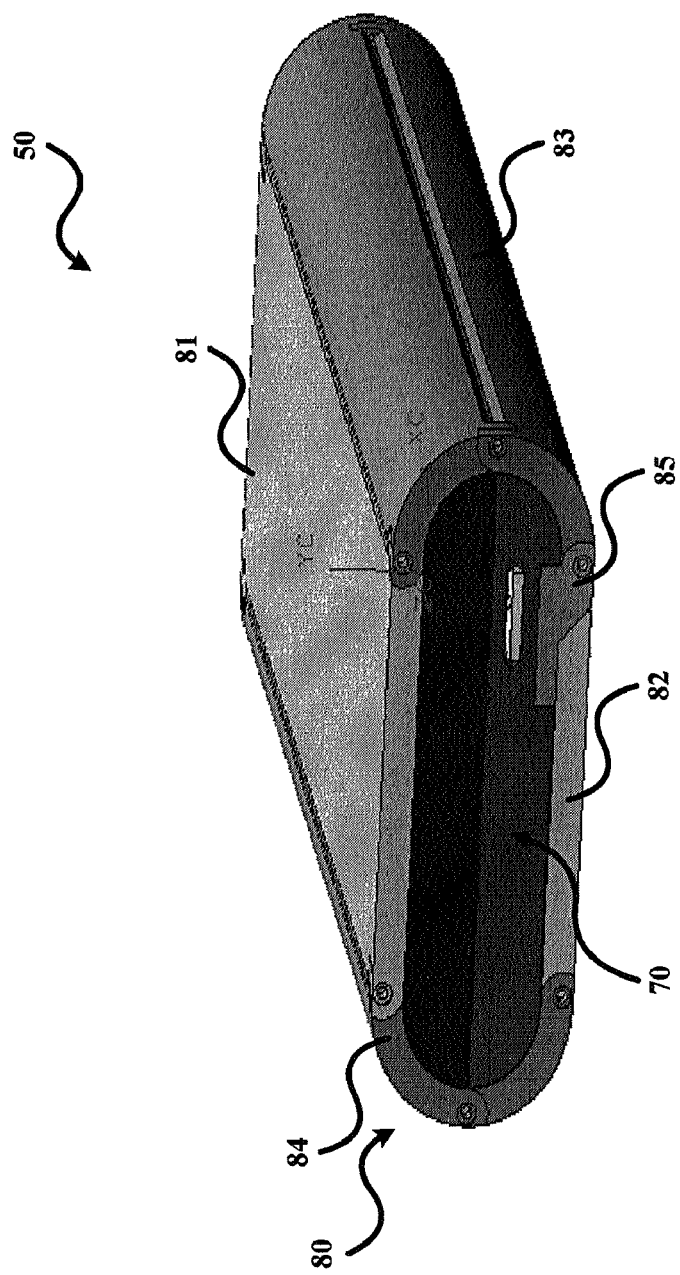
FIGS. 11 and 12 illustrate perspective views of a first embodiment of a wrap display system in a storage state and an operational state, respectively, in accordance with the present invention.
Figure 12:
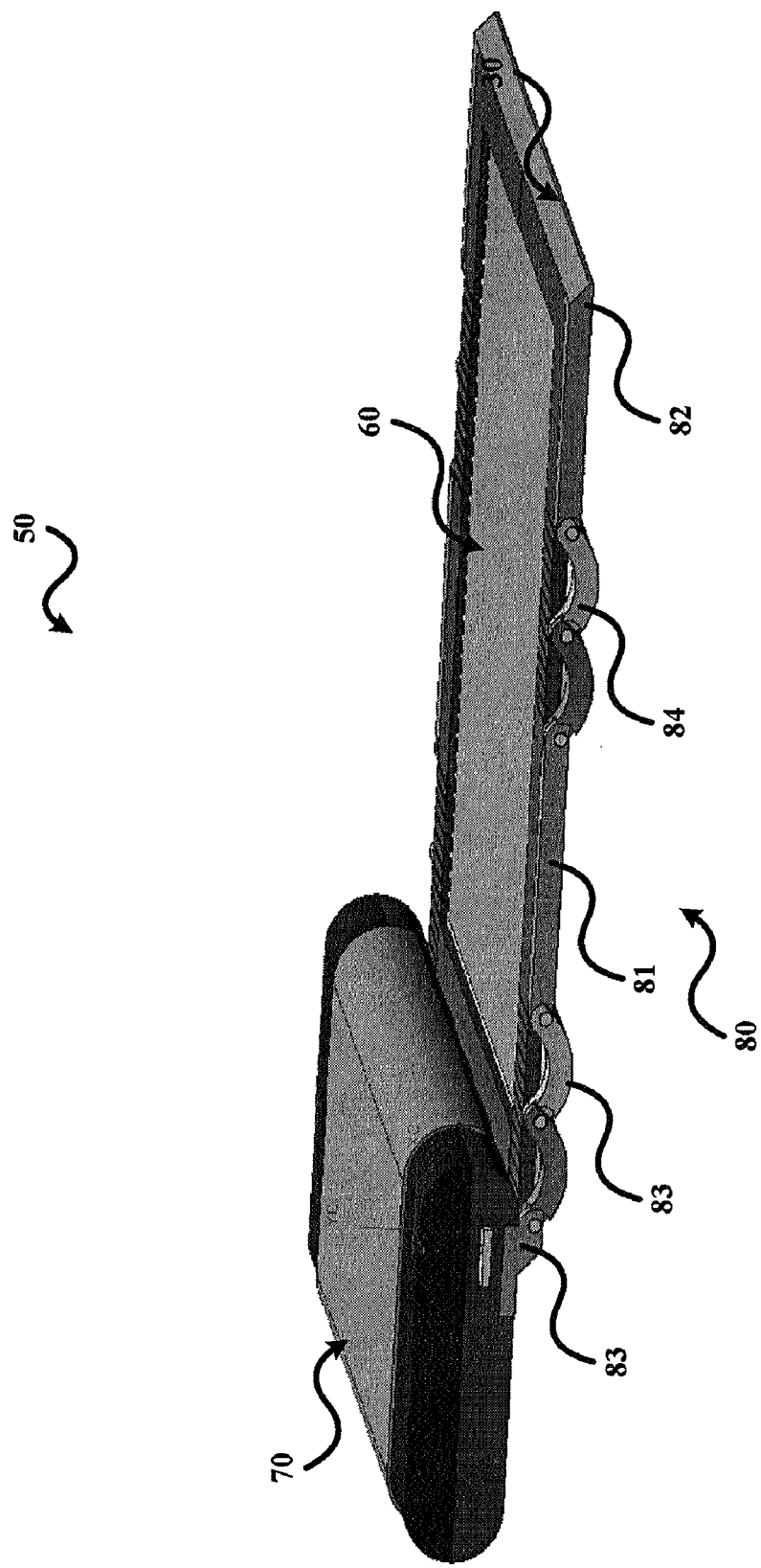

FIGS. 9 and 11 illustrate hinged frame 80 in a curvilinear configuration whereby flexible display foil 60 is wrapped around stick 70 in a storage position defined by supports 81-84 of hinged frame 80. Conversely, FIGS. 10 and 12 illustrate hinged frame 80 in a planar configuration whereby flexible display foil 60 is unwrapped from around stick 70 in an operational position defined by supports 81-84 of hinged frame 80.

Figure 15:
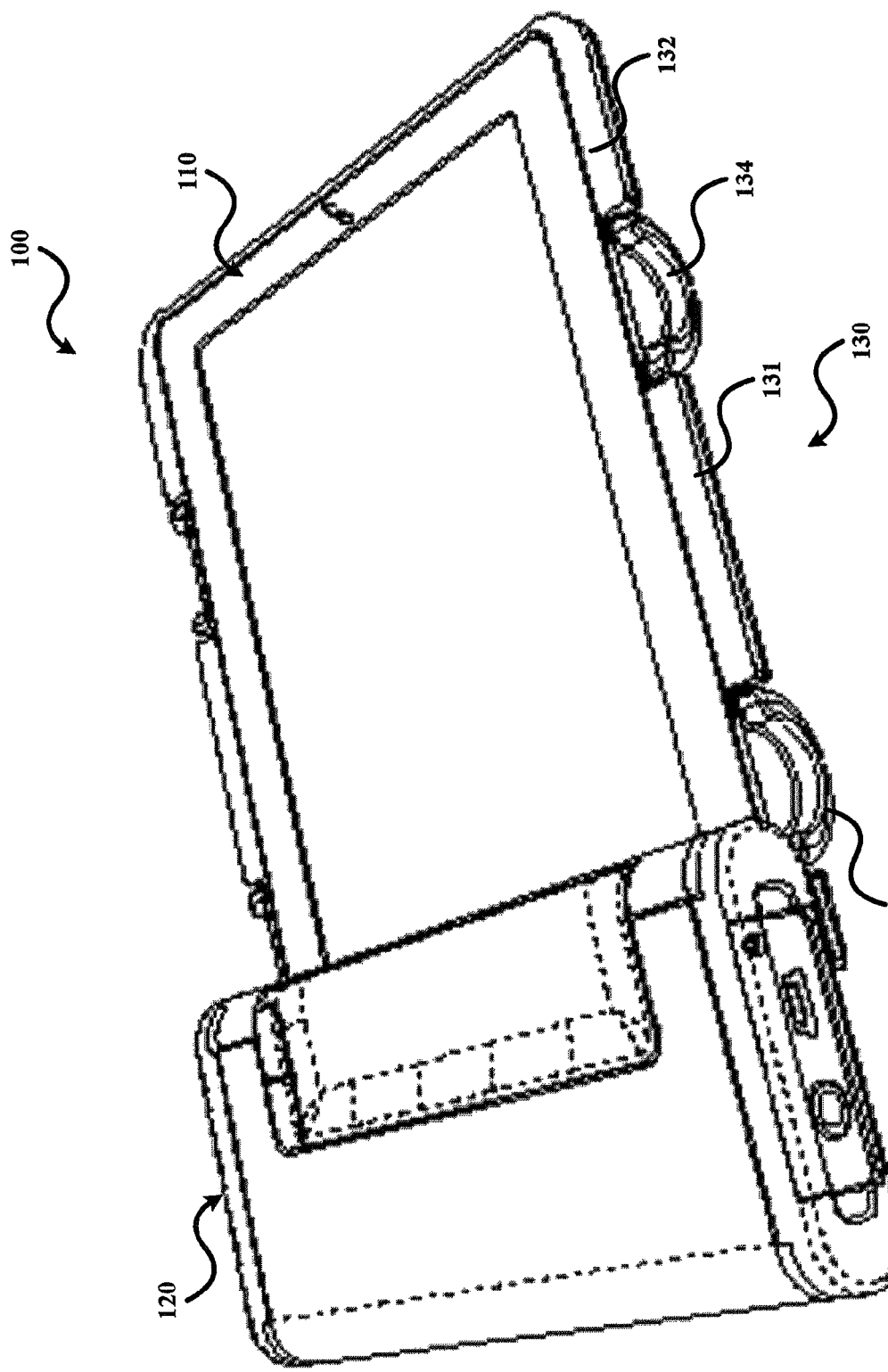
FIG. 15 illustrates a perspective view of a second embodiment of a wrap display system in an operational state in accordance with the present invention.

FIGS. 15-17 illustrate a wrap display system 100 of the present invention incorporating three inventive principles of the present invention. As shown, wrap display system 100 employs a flexible display foil 110 coupled to a stick 120. Portions of flexible display foil 110 adjacent rigid base supports 131 and 132 of a hinged frame 130 are securely connected to rigid base supports 131 and 132. A hinge support 133 of hinged frame 130 has a single arch segment unattached to flexible display foil 110, hinged to stick 120 via a pair of brackets (of which only a bracket 135 is shown) and hinged to rigid base support 131. A hinge support 133 of hinged frame 130 has a single arch segment unattached to flexible display foil 110 and hinged to bases support 131 and 132.

FIG. 16 illustrates hinged frame 130 in a curvilinear configuration whereby flexible display foil 110 is wrapped around stick 120 in a storage position defined by supports 131-134 of hinged frame 130. Conversely, FIGS. 15 and 17 illustrate hinged frame 130 in a planar configuration whereby flexible display foil 110 is unwrapped from around stick 120 in an operational position defined by supports 131-134 of hinged frame 130.

Those having ordinary skill in the art will appreciate that the hinged frame of the present invention can include hinge supports and rigid base supports that may or may not extend entirely under a flexible display foil.

Those having ordinary skill in the art will appreciate numerous advantages and benefits of the present invention including, but not limited to, a flexible display being attached to rigid based supports in the areas where the flexible display does not need with hinge supports for moving the rigid base supports and hinges positions chosen along the rigid base supports such that any length difference due to the different wrapped radius of the flexible display and hinge supports is compensated for.

A flexible display foil of the present invention can be locked when wrapped around a stick of the present invention in an conventional manner, such as, for example, by a snap assembly or a Velcro® assembly integrated on a display cover of the present invention.

From the preceding description of the present invention, those having ordinary skill in the art will appreciate various advantages of the present invention. In particular, a construction of a hinged frame for providing adequate readability and proper storage for a flexible display.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A wrap display system, comprising:
   a stick;
   a flexible display structurally configured to be wrapped around the stick,
   wherein the flexible display is wrapped around the stick for facilitating a storage of the flexible display, and
   wherein the flexible display is unwrapped from around the stick for facilitating an operation of the flexible display; and
   a hinged frame, structurally configured to support the flexible display, comprising:
      a hinge support having a first hinge point, a second hinge point, and a rigid arched segment disposed between the first and second hinge points; and
      a base support hinged to each of the first and second hinge points for facilitating the storage and the operation positions of the flexible display,
   arranged such that during the storage of the flexible display, a portion of the flexible display is partially stored in the arched segment of the hinge support and forms a curvilinear configuration, and during the operation of the flexible display, the portion of the flexible display leaves the arched segment and forms a planar configuration supported by the base supports.

2. The wrap display system of claim 1, wherein the hinged frame further includes at least one hinge support hinged to at least one rigid base support to facilitate a movement of the hinged frame between the curvilinear configuration and the planar configuration.

3. The wrap display system of claim 2, wherein the storage position of the flexible display is a curvilinear profile defined by the hinged frame in response to each hinge support being in a closed state.

4. The wrap display system of claim 2, wherein the operational position of the flexible display is a planar profile defined by the hinged frame in response to each hinge support being in an open state.

5. The wrap display system of claim 2, wherein, in the storage position of the flexible display, a display segment of the flexible display has a curvilinear profile with at least locally an approximately constant radius, the curvilinear profile being adapted to a profile of the stick.

6. The wrap display system of claim 2, wherein a first hinge support is hinged to a first rigid base support at a first hinge position and to a second rigid base support at a second hinge position; and
   wherein a display segment of the flexible display is adjacent the first hinge support and unattached to the hinged frame.

7. The wrap display system of claim 6, wherein a distance between the first hinge position and the second hinge position across the first hinge support in an open state relative to a length of the first display segment facilitates the display segment being uniformly stowed within the first hinge support in response to the hinged frame being in the curvilinear configuration.

8. The wrap display system of claim 6, wherein a distance between the first hinge position and the second hinge position across the first hinge support in an open state relative to a length of the first display segment facilitates the display segment being flat and straight across the first hinge support in response to the hinged frame being in the planar configuration.

9. The wrap display system of claim 2, wherein a first hinge support of the at least one hinge support includes a first arch segment hinged to a first rigid base support of the at least one rigid base support.

10. The wrap display system of claim 9, wherein the first arch segment is pivotable relative to the first rigid base support to thereby move the first hinge support between an open state and a closed state.

11. The wrap display system of claim 9, wherein the first arch segment is further hinged to a second rigid base support of the at least one rigid base support.

12. The wrap display system of claim 11, wherein the first arch segment is pivotable relative to the first rigid base support and the second rigid base support to thereby facilitate movement of the first hinge support between an open state and a closed state.

13. The wrap display system of claim 9, wherein a first hinge support of the at least one hinge support includes a second arch segment hinged to a second rigid base support of the at least one rigid base support.

14. The wrap display system of claim 13, wherein the first arch segment is pivotable relative to the first rigid base support and the second arch segment is pivotable relative to the second rigid base support to thereby facilitate movement of the first hinge support between an open state and a closed state.

15. The wrap display system of claim 14, wherein the first arch segment is hinged to the second arch segment to further facilitate movement of the first hinge support between the open state and the closed state.

16. A wrap display system, comprising:
   a stick;
   a flexible display structurally configured to be wrapped around the stick,
   wherein the flexible display is wrapped around the stick for facilitating a storage of the flexible display; and
   a hinged frame, structurally configured to support the flexible display, comprising:
      a hinge support having a first hinge point, a second hinge point, and a rigid arched segment disposed between the first and second hinge points; and
      a base support hinged to each of the first and second hinge points for facilitating the storage and the operation positions of the flexible display,
   arranged such that during the storage of the flexible display, a portion of the flexible display is partially stored in the arched segment of the hinge support and forms a curvilinear configuration.

17. The wrap display system of claim 16, wherein the hinged frame further includes at least one hinge support hinged to at least one rigid base support to facilitate a movement of the hinged frame between the curvilinear configuration and a planar configuration.

18. The wrap display system of claim 17, wherein a first hinge support is hinged to a first rigid base support at a first hinge position and to a second rigid base support at a second hinge position;
   wherein a display segment of the flexible display is adjacent the first hinge support and unattached to the hinged frame; and wherein a distance between the first hinge position and the second hinge position across the first hinge support in an open state relative to a length of the first display segment facilitates the display segment being uniformly stowed within the first hinge support in response to the hinged frame being in the curvilinear configuration and further facilitates the display segment being flat and straight across the first hinge support in response to the hinged frame being in the planar configuration.

19. A wrap display system, comprising:
a stick;
a flexible display structurally configured to be wrapped around the stick,
wherein the flexible display is unwrapped from around the stick for facilitating an operation of the flexible display; and
a hinged frame, structurally configured to support the flexible display, comprising:
a hinge support having a first hinge point, a second hinge point, and a rigid arched segment disposed between the first and second hinge points; and
a base support hinged to each of the first and second hinge points for facilitating the storage and the operation positions of the flexible display,
arranged such that during the operation of the flexible display, a portion of the flexible display leaves the arched segment and forms a planar configuration supported by the base supports.

20. The wrap display system of claim 19, wherein the hinged frame further includes at least one hinge support hinged to at least one rigid base support to facilitate a movement of the hinged frame between a curvilinear configuration and the planar configuration.

21. The wrap display system of claim 20, wherein a first hinge support is hinged to a first rigid base support at a first hinge position and to a second rigid base support at a second hinge position;
wherein a display segment of the flexible display is adjacent the first hinge support and unattached to the hinged frame; and
wherein a distance between the first hinge position and the second hinge position across the first hinge support in an open state relative to a length of the display segment facilitates the display segment being uniformly stowed within the first hinge support in response to the hinged frame being in the curvilinear configuration and further facilitates the display segment being flat and straight across the first hinge support in response to the hinged frame being in the planar configuration.

22. The wrap display system of claim 1 wherein the hinged frame includes pivotable interconnected supports.

23. The wrap display system of claim 1 wherein the stick is a body defining a cavity for housing electronic circuits that drive the flexible display.

24. The wrap display system of claim 2 wherein the at least one hinge support is pivotably connected with the at least one rigid base support, and wherein both the hinge support and the rigid base support extend vertically across the flexible display in a direction orthogonal to a non-wrapping direction of the flexible display.

25. The wrap display system of claim 1, further comprising a third hinge point dividing the rigid arched segment into a first rigid arched portion and a second rigid arched portion.

26. The wrap display system of claim 16, further comprising a third hinge point dividing the rigid arched segment into a first rigid arched portion and a second rigid arched portion.

27. The wrap display system of claim 19, further comprising a third hinge point dividing the rigid arched segment into a first rigid arched portion and a second rigid arched portion.

* * * * *